(12) United States Patent
Kasahara et al.

(10) Patent No.: US 9,989,760 B2
(45) Date of Patent: Jun. 5, 2018

(54) HEADUP DISPLAY DEVICE

(71) Applicant: NIPPON SEIKI CO., LTD., Niigata (JP)

(72) Inventors: Tsuyoshi Kasahara, Niigata (JP); Yuichi Takahashi, Niigata (JP); Takashi Yamazoe, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 5 days.

(21) Appl. No.: 14/780,502

(22) PCT Filed: Mar. 11, 2014

(86) PCT No.: PCT/JP2014/056328
§ 371 (c)(1),
(2) Date: Sep. 25, 2015

(87) PCT Pub. No.: WO2014/156613
PCT Pub. Date: Oct. 2, 2014

(65) Prior Publication Data
US 2016/0048017 A1    Feb. 18, 2016

(30) Foreign Application Priority Data
Mar. 27, 2013 (JP) .................. 2013-065613

(51) Int. Cl.
*G02B 27/01* (2006.01)
*G02B 17/00* (2006.01)

(52) U.S. Cl.
CPC ....... *G02B 27/0101* (2013.01); *G02B 17/006* (2013.01); *G02B 2027/0125* (2013.01)

(58) Field of Classification Search
CPC .............. G02B 27/0101; G02B 17/006; G02B 2027/0125
(Continued)

(56) References Cited

U.S. PATENT DOCUMENTS 5,334,995 A * 8/1994 Iino ................. G02B 27/0101
340/461
7,391,574 B2 * 6/2008 Fredriksson ....... G02B 27/0103
345/7
(Continued)

FOREIGN PATENT DOCUMENTS

JP    2003-29196 A    1/2003
WO   2010/092409 A1   8/2010

OTHER PUBLICATIONS

International Search Report PCT/JP2014/056328 filed May 27, 2014 with English translation.

*Primary Examiner* — Ricky Mack
*Assistant Examiner* — Daniele Manikeu
(74) *Attorney, Agent, or Firm* — McDermott Will & Emery LLP

(57) ABSTRACT

Provided is a headup display apparatus that is capable of accurately outputting stable display light, a collimator lens, collimates image light, as parallel light, said image light having been outputted from a display means. A parallel light guide has a first surface, which has the parallel light from the collimator lens inputted thereto, and which reflects a part of the parallel light and transmits a part of the parallel light as transmitted light beams, and a second surface that reflects the parallel light to the first surface, said first surface and second surface being provided in parallel to each other. The parallel light guide outputs the transmitted light beams from the first surface, and the parallel light is inputted to the first surface at a predetermined angle.

2 Claims, 9 Drawing Sheets

(58) Field of Classification Search
USPC .................................. 359/629–633
See application file for complete search history.

(56) References Cited

U.S. PATENT DOCUMENTS

| | | | | |
|---|---|---|---|---|
| 7,477,453 | B2* | 1/2009 | Repetto | G02B 17/0856 |
| | | | | 359/630 |
| 8,520,310 | B2* | 8/2013 | Shimizu | G02B 27/0172 |
| | | | | 345/7 |
| 2002/0171939 | A1* | 11/2002 | Song | G02B 27/0172 |
| | | | | 359/630 |
| 2003/0016451 | A1 | 1/2003 | Aoki et al. | |
| 2003/0214474 | A1* | 11/2003 | Aoki | B60K 35/00 |
| | | | | 345/87 |
| 2006/0215244 | A1 | 9/2006 | Yosha et al. | |
| 2011/0176218 | A1* | 7/2011 | Noui | G02B 6/0035 |
| | | | | 359/633 |
| 2011/0221657 | A1* | 9/2011 | Haddick | G02B 27/017 |
| | | | | 345/8 |
| 2012/0002256 | A1 | 1/2012 | Lacoste et al. | |
| 2012/0194553 | A1* | 8/2012 | Osterhout | G02B 27/0093 |
| | | | | 345/633 |
| 2012/0243102 | A1* | 9/2012 | Takeda | G02B 17/086 |
| | | | | 359/630 |
| 2012/0300311 | A1* | 11/2012 | Simmonds | G02B 27/0081 |
| | | | | 359/630 |
| 2013/0194674 | A1* | 8/2013 | Horiuchi | G02B 27/0101 |
| | | | | 359/631 |
| 2013/0222896 | A1* | 8/2013 | Komatsu | G02B 17/0848 |
| | | | | 359/365 |
| 2014/0285899 | A1* | 9/2014 | Kilcher | G02B 13/22 |
| | | | | 359/631 |

* cited by examiner

HEADUP DISPLAY DEVICE

CROSS-REFERENCE TO RELATED APPLICATIONS

This application is the U.S. National Phase of PCT/JP2014/056328 filed Mar. 11, 2014, which claims priority to Japanese Patent Application No. 2013-065613 filed Mar. 27, 2013. The subject matter of each is incorporated herein by reference in entirety.

TECHNICAL FIELD

The present invention relates to a headup display device.

BACKGROUND ART

A headup display device disclosed in Patent Literature 1 is known as a conventional headup display. The headup display device comprises a display device, a collimator lens, and a pair of plane mirrors arranged in parallel. One of the pair of plane mirrors is a semi-transparent mirror that reflects a part of incident light and transmits a part thereof. Light (display light) transmitted from the display device enters the collimator lens and becomes parallel light, and enters a pair of plane mirrors arranged in parallel. As one of the plane mirrors arranged in parallel is a semi-transparent mirror, a part of the pair of parallel light entered into the semi-transparent mirror is emitted from the semi-transparent mirror. The parallel light entered into the pair of plane mirrors arranged in parallel repeats reflection between the plane mirrors. Thus, a plurality of light is emitted from the semi-transparent mirror. The plurality of parallel light emitted from the semi-transparent mirror is reflected by a plane transparent plate (so-called a combiner), and the parallel light reaches an eye of an observer. As the parallel light enters an eye of an observer, the observer recognizes as if a display image is present in a distant place by viewing a virtual image projected onto the combiner.

Sense of distance (perspective) of the display will be briefly described. As shown in FIG. 10, the observer recognizes the distance to an object G1 by an angle formed by a line of sight E1 to the object G1 incident on a right eye 3R and a left eye 3L. When an object is present in a distant position (G2), an angle formed by a line of sight E2 to an object G2 incident on the right eye 3R and the left eye 3L decreases, and the observer recognizes as if the object G2 is present in a distant place. Light emitted from the semi-transparent mirror described in Patent Literature 1 is, as shown in FIG. 11, enters substantially parallel to the right eye 3R and the left eye 3L of the observer, the angle formed by a line of sight E3 to the right eye 3R and the left eye 3L becomes zero (parallel). Thus, it is possible to recognize as if the object G3 is present in a distant place (infinite). Further, as a plurality of parallel light is emitted from the semi-transparent mirror described in Patent Literature 1, it is possible to ensure a wide viewable area where a virtual image can be viewed even when the positions of the right eye 3R and the left eye 3L are moved, as shown in FIG. 11.

In such a configuration, by being kept in parallel, a pair of plane mirrors repeating reflection stably emits a plurality of light from a semi-transparent mirror at a predetermined emission angle.

CITATION LIST

Patent Literature

Patent Literature 1; International Publication No. 2010-092409

SUMMARY OF THE INVENTION

Problems to be Solved by the Invention

However, in such a headup display device disclosed above, a pair of parallel mirrors must be aligned with high precision, a parallel of the pair of parallel mirrors is disturbed due to errors during assembly or the like, and stable emission light may not be obtained.

The present invention has been made in view of the circumstance described above. Accordingly, it is an object of the present invention to provide a headup display device capable of emitting stable display light with high precision.

Solution to Problem

To achieve the above object, a headup display device according to the present invention, that projects display light and allows recognizing an image represented by the display light as a virtual image, the headup display device comprising a display means that emits light representing the image; a collimating optics that collimates the light emitted from the display means into parallel light; and a parallel optical member that emits a plurality of transmitted light from a first surface being provided in parallel to a second surface, the first surface entering the parallel light from the collimating optics, reflecting a part of the parallel light, and transmitting a part thereof as transmitted light, and the second surface reflecting the parallel light to the first surface, wherein the parallel light enters the first surface at a predetermined incident angle, and the transmitted light in the first surface is projected as the display light.

Effect of the Invention

According to the present invention, it is possible to form a parallel precisely between a first surface and a second surface by providing a parallel optical member, in which a first surface for transmitting and reflecting light is arranged in parallel to a second surface for reflecting light. Further, parallel light enters the first surface at a predetermined incident angle, and the first surface and the second surface are arranged in parallel. Thus, reflected light reflecting in the parallel optical member always enters the first surface at the predetermined incident angle. Therefore, it is possible to emit stably the transmitted light emitted from the first surface (passing through the first surface) as parallel transmitted light (display light) at a predetermined angle with respect to the first surface.

MODE FOR CARRYING OUT THE INVENTION

First Embodiment

An embodiment of the present invention will be described with reference to FIG. 1 to FIG. 5.

Figure 1:
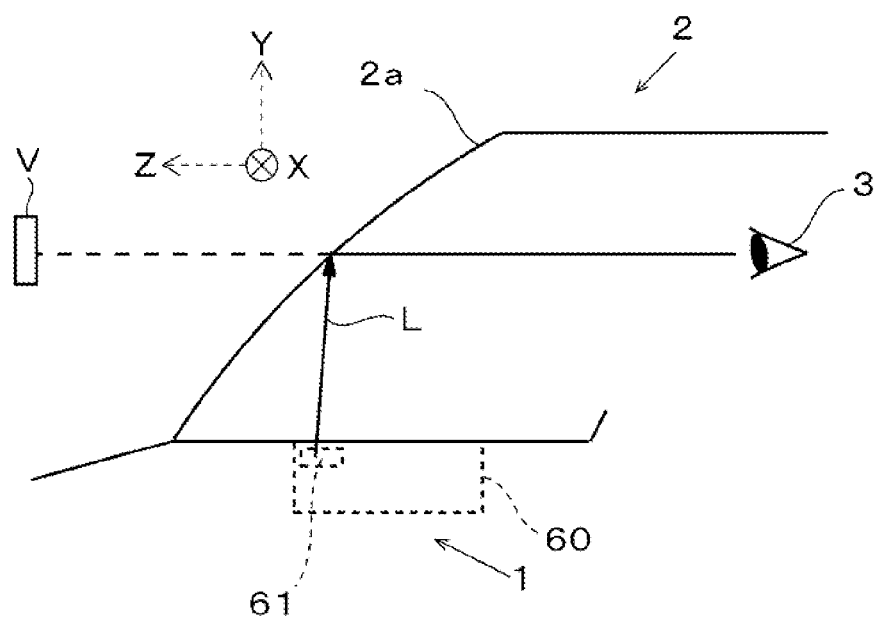
FIG. 1 is a schematic diagram showing a state that a headup display device according to a first embodiment of the present invention is mounted on a vehicle.

FIG. 1 shows an outline of a headup display device (hereinafter, referred to as a HUD device) according to an embodiment of the present invention. Here, a lateral direction of a vehicle 2 (a lateral direction of an eye 3 of an observer) is defined as an X-axis, a vertical direction of a vehicle 2 (a vertical direction of an eye 3 of an observer) is defined as a Y-axis, and a viewing direction of an observer vertical to the X-axis and Y-axis is defined as a Z-axis (FIG. 1).

A HUD device 1 according to the embodiment is installed on a dashboard of a vehicle 2 as shown in FIG. 1. The HUD device 1 emits display light L representing a virtual image V of a display image from an emitting part 61 to a windshield 2a (plain surface) of the vehicle 2. The display light L reflects on the windshield 2a, and reaches an eye 3 of an observer. The observer recognizes a virtual image V of a display image represented by the display light L reflected by the windshield 2a (a virtual image projected onto the windshield 2a). The observer recognizes, through the windshield 2a, as if the display image is present in a distant place.

Figure 2:
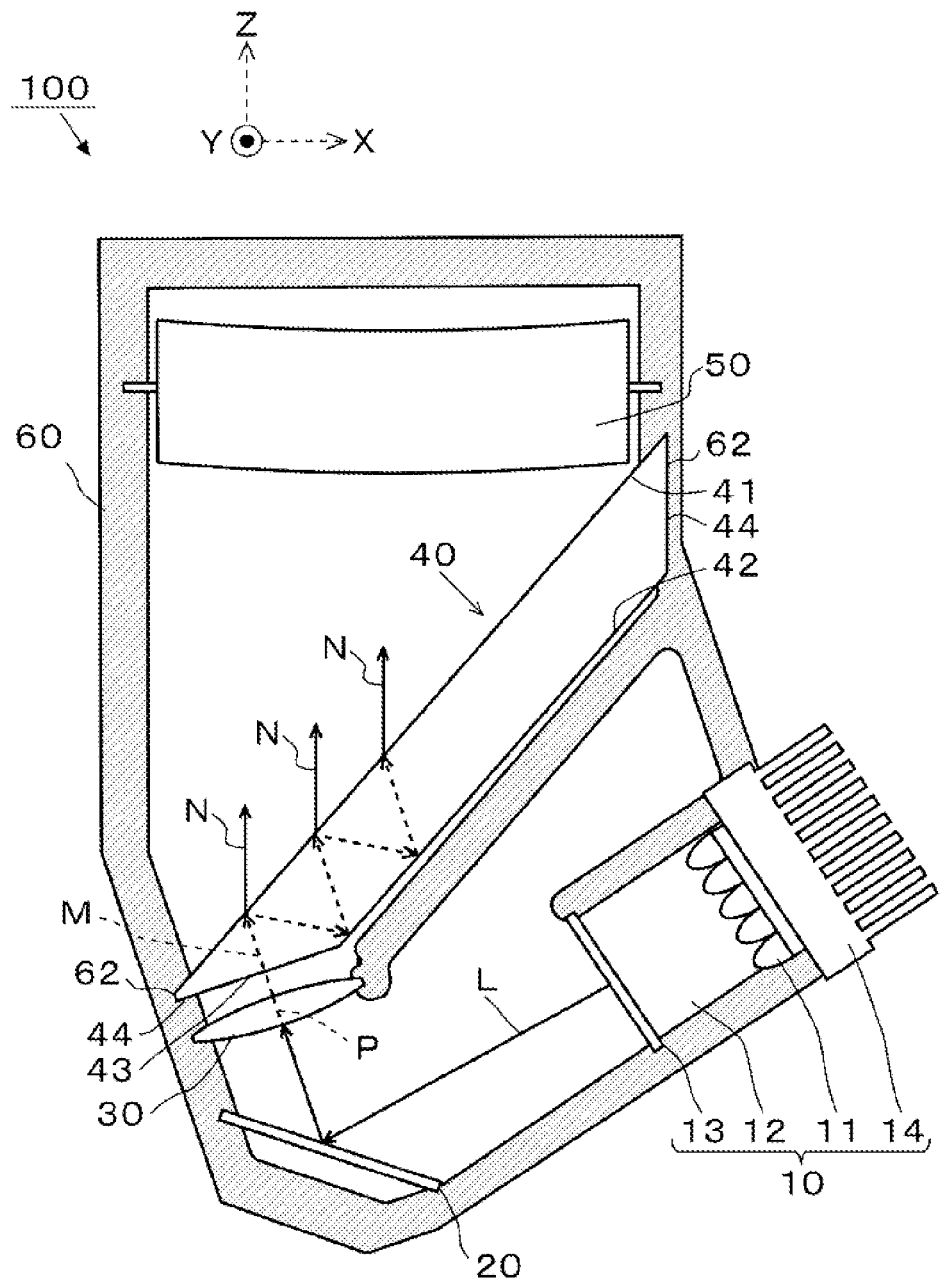
FIG. 2 is a schematic sectional view in an XZ plane showing a configuration of a headup display device according to the above embodiment.
Figure 3:
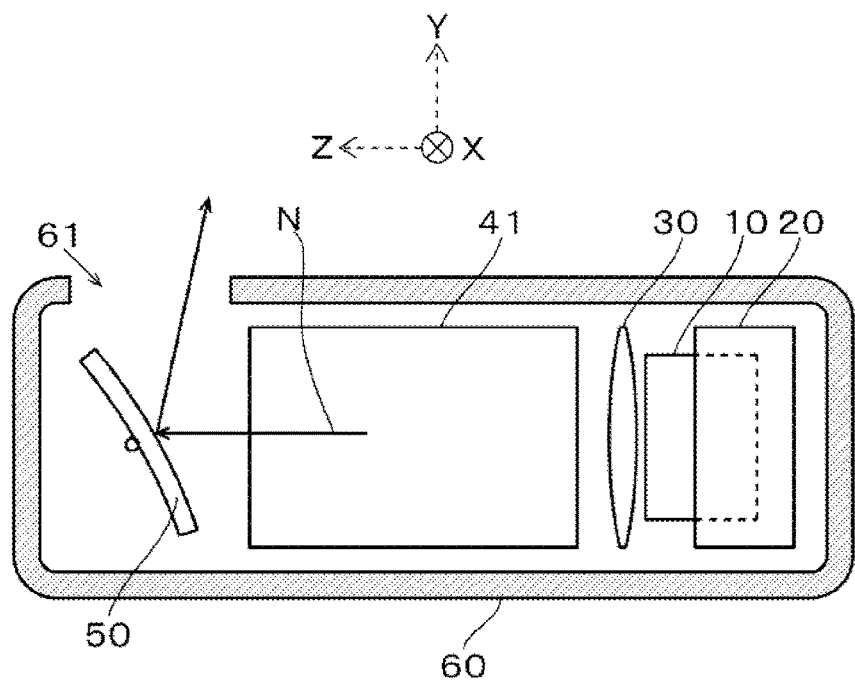
FIG. 3 is a schematic sectional view in a YZ plane showing a configuration of a headup display device according to the above embodiment.

FIG. 2 is a schematic sectional view in the substantially XZ plane of the HUD device 1 in the vehicle 2 (FIG. 1). FIG. 3 shows a schematic sectional view in the substantially YZ plane oft the HUD device 1 in the vehicle 2 (FIG. 1). Here, as in FIG. 1, a lateral direction of the vehicle 2 (a lateral direction of the eye 3 of the observer) is defined as an X-axis, a vertical direction of the vehicle 2 (a vertical direction of the eye 3 of the observer) is defined as a Y-axis, and a viewing direction of the observer vertical to the X-axis and Y-axis is defined as a Z-axis (FIGS. 2 and 3).

The HUD device 1 comprises, as shown in FIG. 2, a display means 10 disposed in a housing 60, a folding mirror 20, a collimator lens (collimating optics) 30, and a parallel light guide (parallel optical member) 40, and a correction mirror 50. Further, the HUD device 1 is provided with a control unit (not shown).

The image light L emitted from the display means 10 reflects on the folding mirror 20, and enters the collimator lens 30. The image light L is collimated by the collimator lens 30 (the collimator lens 30 emits parallel light M). The parallel light M emitted from the collimator lens 30 enters the parallel light guide 40. In the parallel light guide 40, one reflection surface is a semi-transparent surface 41 that reflects a part of incident light and transmits a part thereof as transmitted light N. The parallel light M incident on the parallel light guide 40 repeats reflection in the parallel light guide 40, and a part of the parallel light M exits from the parallel light guide 40 as a plurality of transmitted light (display light) N (a plurality of transmitted light N passes through the semi-transparent surface 41).

A plurality of transmitted light (display light) N passing through the semi-transparent surface (first surface) 41 reflects on a correction mirror 50 described later, and exits from an emitting part 61 provided on the surface of the housing 60 toward the windshield 2a (FIG. 3). The display light N exiting from the emitting part 61 enters the windshield 2a. The windshield 2a reflects the plurality of incident display light N, and the reflected display light N reaches the eye 3 of the observer.

In the embodiment, the windshield 2a is a glass having a predetermined curved surface (convex to the outside of the vehicle 2) (FIG. 1). The parallel light guide 40 enters the parallel light M from the collimator lens 30, and repeats reflection and transmission of the parallel light M in the parallel light guide 40, thereby emitting a plurality of parallel transmitted light N from the semi-transparent surface 41. The plurality of parallel transmitted light N is reflected by a correction mirror 50 described later toward the emitting part 61 (toward the windshield 2a) as light (divergent light) tilted in advance an optical axis considering a curvature of the windshield 2a. The plurality of transmitted light N tilted in advance an optical axis considering a curvature of the windshield 2a becomes light parallel to the YZ plane when reflecting on the windshield 2a, and enters each of the left and right eyes 3 of the observer as light parallel in the lateral direction. Therefore, the observer recognizes, through the windshield 2a, as if a display image is present in a distant place.

A specific configuration of the HUD device 1 will be described. To facilitate the understanding of the invention, a description will be limited to the parallel light M emitted from the collimator lens 30.

(Display Means, Folding Mirror, Collimator Lens)

In the embodiment, the display means 10 comprises a light source 11, a diffusing part 12, a liquid crystal display panel 13, and a heat sink 14. The light source 11 comprises a plurality of LEDs (Light Emitting Diode). The light source 11 emits light for illuminating the liquid crystal display panel 13. The diffusing part 12 is a space formed as a part of the housing 60 between the light source 11 and the liquid crystal display panel 13. The inside wall of the diffusing part is painted with white paint to diffuse the light emitted from the light source 11 and illuminate the back of the liquid crystal display panel 13. The diffusing part 12 diffuses the light emitted from the light source, and uniformly illuminates the liquid crystal display panel. The liquid crystal display panel 13 generates a display image by modulating the illumination light from the diffusing part 12, according to a video signal transmitted from a control unit described later. The liquid crystal display panel 13 emits an image light L representing a display image. The diffusing part 12 may be provided with a translucent synthetic resin member, such as polycarbonate colored in white, to transmit the light from the light source 11 to the liquid crystal display panel 13 by more efficiently diffusing the light.

The heat sink 14 is made of a metal such as aluminum, and dissipates the heat generated by the light source 11. The heat sink 14 is disposed on the surface of the light source 11 opposite to the surface for emitting light.

The folding mirror 20 is a plain aluminum deposited mirror, for example, and reflects the image light L emitted from the liquid crystal display panel 13 to the collimator lens 30. The folding mirror 20 is disposed to be inclined with respect to the display surface of the liquid crystal display panel 13 to reflect the image light L by folding it (FIG. 2). Further, as the folding mirror 20 simply reflects the image light L to the collimator lens 30, it may be omitted depending on the arrangement of the display means 10 and the collimator lens 30.

The collimator lens 30 is a convex lens, for example. The collimator lens 30 is disposed on the optical path of the image light L reflected by the folding mirror 20 such that the distance from the collimator lens 30 to a display image (the sum of the distance from the collimator lens 30 to the folding mirror 20 and the distance from the folding mirror 20 to the liquid crystal display panel 13) becomes substantially the same as the focal distance of the collimator lens 30 (FIG. 2). The collimator lens 30 collimates the incident image light L. The collimator lens 30 has a lens optical axis P.

(Parallel Light Guide (Parallel Optical Member))

A parallel light guide 40 is a plate-shaped light guide formed of a translucent synthetic resin such as polyethylene terephthalate, polycarbonate, polyethylene, or acrylic. The parallel light guide 40 comprises a semi-transparent surface 41 that reflects a part of the light traveling in the parallel light guide 40 and transmits a part thereof as transmitted light N, a reflection surface 42 that is parallel to the semi-transparent surface 41 and reflects a part of the light traveling in the parallel light guide 40 to the semi-transparent surface 41, a light incident part 43 that enters the parallel light M emitted from the collimator lens 30 and takes it into the parallel light guide 40, and an engaging part 44 that is formed in a part of the parallel light guide 40 and engages with an attaching part 62 of the housing 60.

Figure 4:
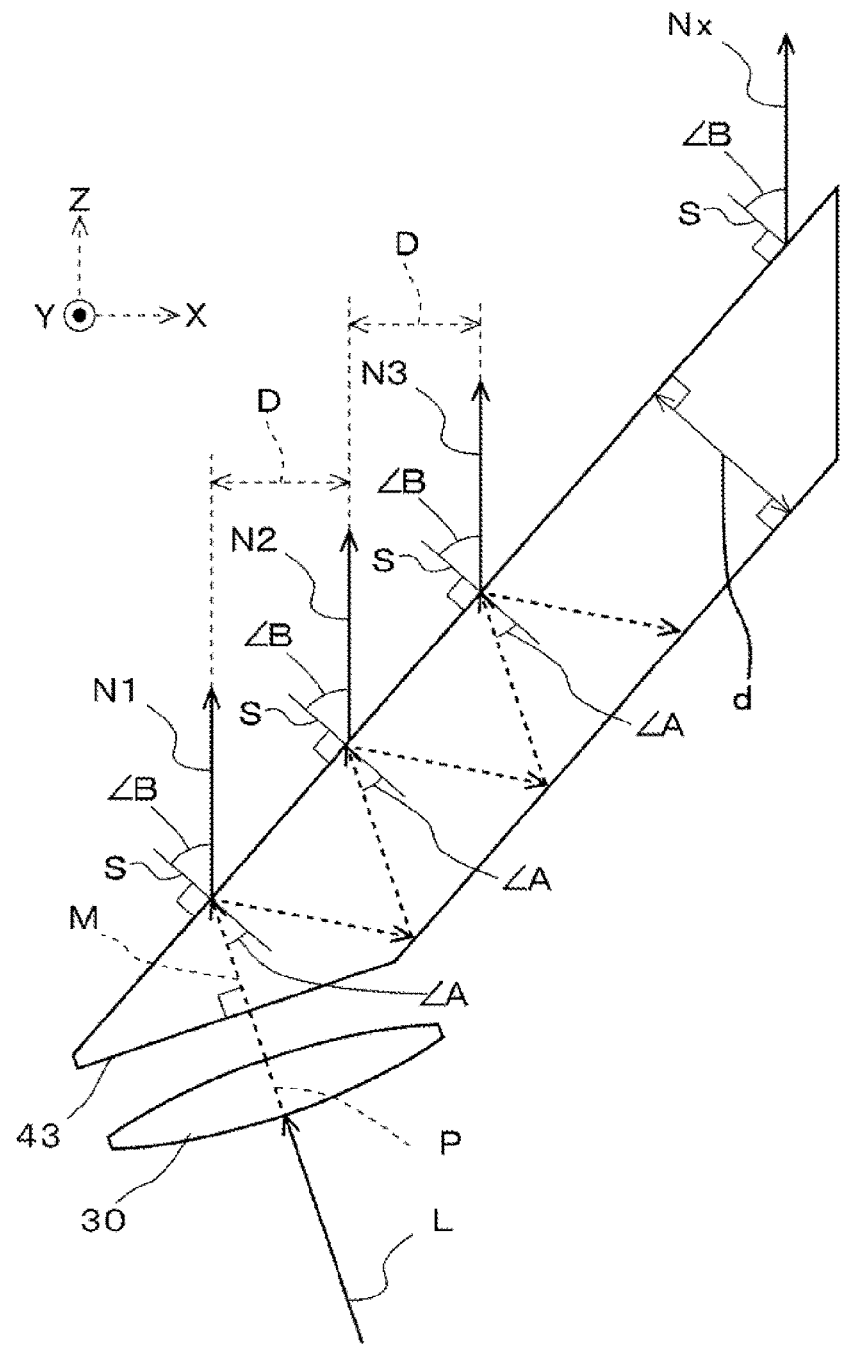
FIG. 4 is a diagram explaining an optical path of light traveling in a plane light guide in the above embodiment.

The semi-transparent surface 41 and the reflection surface 42 are, as shown in FIG. 4, disposed in parallel with a distance d, and arranged to be inclined to have a predetermined angle A (∠A<a critical angle) between the lens optical axis P of the collimator lens 30 (the parallel light M emitting direction) and the perpendicular S of the semi-transparent surface 41 (i.e., the parallel light M enters the semi-transparent surface 41 at an incident angle A). On the semi-transparent surface 41 and the reflection surface 42, a reflectance adjustment layer (41a, 41b) is formed to have a desired reflectance by depositing a metal such as aluminum on the surface of the parallel light guide 40. Reflectance (transmittance) is adjusted by the thickness and type of the reflectance adjustment layer (41a, 41b). The reflectance adjustment layer 41a adjusts the reflectance to substantially 90% when the incident angle in the semi-transparent surface 41 is the angle A. The reflectance adjustment layer 41b adjusts the reflectance to substantially 100% (to increase reflectance as large as possible) when the incident angle in the reflection surface 42 is the angle A. Incidentally, as a method of adjusting the reflectance (transmittance) of the semi-transparent surface 41 and the reflection surface 42, in addition to the above metal deposition, it is possible to adjust the reflectance (transmittance) by pasting a metal film or the like.

The light incident part 43 is formed to be a plane perpendicular to the lens optical axis P of the collimator lens 30, and is not subjected to the aluminum deposition described above.

The engaging part 44 provided at both ends of the semi-transparent surface 41, positions and fixes the parallel light guide 40 with respect to the housing 60 by being engaged with the concave attaching part 62 of the housing 60.

Referring to FIG. 4, a function of the parallel light guide 40 will be described.

In the embodiment, the parallel light guide 40 is arranged to be inclined to have a predetermined angle A (∠A<a critical angle) between the lens optical axis P of the collimator lens 30 (the parallel light M emitting direction) and the perpendicular S of the semi-transparent surface 41. Thus, of the parallel light M traveling in the parallel light guide 40, a part of the light incident on the semi-transparent surface 41 is transmitted, and a part thereof is reflected. The reflected light repeats reflection between the semi-transparent surface 41 and the reflection surface 42. At this time, as the semi-transparent surface 41 and the reflection surface 42 are parallel, the incident angle of the reflected light incident on the semi-transparent surface 41 is always the angle A, and the incident angle of the reflection light incident on the reflection surface 42 is always the angle A. As the parallel light guide 40 has a predetermined refractive index (greater than air), the transmitted light N passing through the semi-transparent surface 41 has an exit angle B (angle B>angle A), and is refracted and emitted to the outside of the parallel light guide 40. As the incident angle of the reflected light incident on the semi-transparent surface 41 is always the angle A, the exit angle of the transmitted light N is always the angle B.

A part of the light first entered into the semi-transparent surface 41 is emitted as transmitted light N1 when entering the semi-transparent surface 41. The light quantity ratio between the transmitted light N and the reflected light in the semi-transparent surface 41 is 1:9. Therefore, the light quantity of the transmitted light N1 becomes light that is attenuated to 1/10 of the light quantity of the parallel light M first entered into the semi-transparent surface 41. The transmitted light N1 is different only in the light quantity compared with the parallel light M, and it is the light obtained by collimating the image light L similar to the parallel light M.

On the other hand, of the parallel light M first entered into the semi-transparent surface 41, the light not emitted as the transmitted light N1 reflects on the semi-transparent surface 41, travels toward the reflection surface 42, and reflects on the reflection surface 42, thereby entering again (twice) the semi-transparent surface 41. When the parallel light M enters the semi-transparent surface 41 at the second time, as in the first time, the parallel light guide 40 emits transmitted light N2 that is similar to the parallel light M. In this way, the parallel light guide 40 enters the parallel light M from the collimator lens 30, repeats reflection of the parallel light M between the semi-transparent surface 41 and the reflection surface 42, thereby emitting the transmitted light N (N1, N2, . . . , Nx) whenever entering the parallel light into the semi-transparent surface 41. These transmitted light N (N1, N2, . . . , Nx) are refracted when passing through the semi-transparent surface 41, and are emitted at a substantially constant exit angle B (angle B>angle A) and a predetermined distance D with respect to the semi-transparent surface 41 (the perpendicular S). As described above, the parallel light guide 40 in the embodiment enters the parallel light M from the collimator lens 30, and repeats reflection of the parallel light M between the semi-transparent surface 41 and the reflection surface 42, thereby having a certain angle (an exit angle B) with respect to the semi-transparent surface 41, and emitting stably the transmitted light N attenuated by a constant light quantity (attenuated by 1/10).

As the incident angle A is set smaller than a critical angle, it is possible to emit the transmitted light N from the semi-transparent surface 41. Further, as the semi-transparent surface 41 has a reflectance adjustment layer 41a for increasing reflectance, it is possible to reflect light at a desired reflectance in the parallel light guide 40 while transmitting the transmitted light N from the semi-transparent surface 41. In addition, the distance D of the transmitted light N is the distance based on the incident angle A, the exit angle B (the refractive index of the parallel light guide 40), and the distance (thickness) d of the parallel light guide 40. When the distance D of the transmitted light N is too narrow, the attenuation of the light quantity of the transmitted light N (N1, N2, . . . , Nx) emitted whenever entering the semi-transparent surface 41 increases with respect to the X-axis direction, and it becomes impossible to emit the transmitted light N in a wide range in the X-axis direction. The distance D of the transmitted light N is expressed by the formula (1) based on the refractive index n of the light guide 40, the incident angle A, and the distance (thickness) d of the light guide 40. By setting the incident angle A to maximize the distance D of the transmitted light N, it is possible to emit the transmitted light N in a wind rage in the X-axis direction.

[Formula 1]

$$D = 2d\sqrt{1-n^2\sin^2 A}\, \tan A \tag{1}$$

(Correction Mirror)

A correction mirror 50 is an aluminum deposited mirror, for example, and is disposed on the optical path of the transmitted light N passing through the semi-transparent surface 41. The correction mirror 50 reflects the transmitted light N passing through the semi-transparent surface 41 as to diverge in the direction of the windshield 2a through the emitting part 61. In this case, the correction mirror 50 reflects the transmitted light N entered as the light parallel to the YZ plane toward the windshield 2a as divergent light. The divergent light is, when entering the windshield 2a, reflected toward the eye of the observer as display light parallel to the YZ plane (FIGS. 2 and 3). In other words, the correction mirror 50 has a curved surface shape based on the curved surface shape of the windshield 2a, which reflects a plurality of transmitted light N parallel to the YZ plane passing through the semi-transparent surface 41, as nonparallel divergent light, and changes it to the light parallel to the YZ plane when reflecting on the windshield 2a.

The curved surface shape of the correction mirror 50 can be obtained from the curved surface shape of the windshield 2a by using commercially available optical simulation software (for example, Synopsys Inc. CODEV, Lambda Research Corp. OSLO, etc.).

Figure 5:
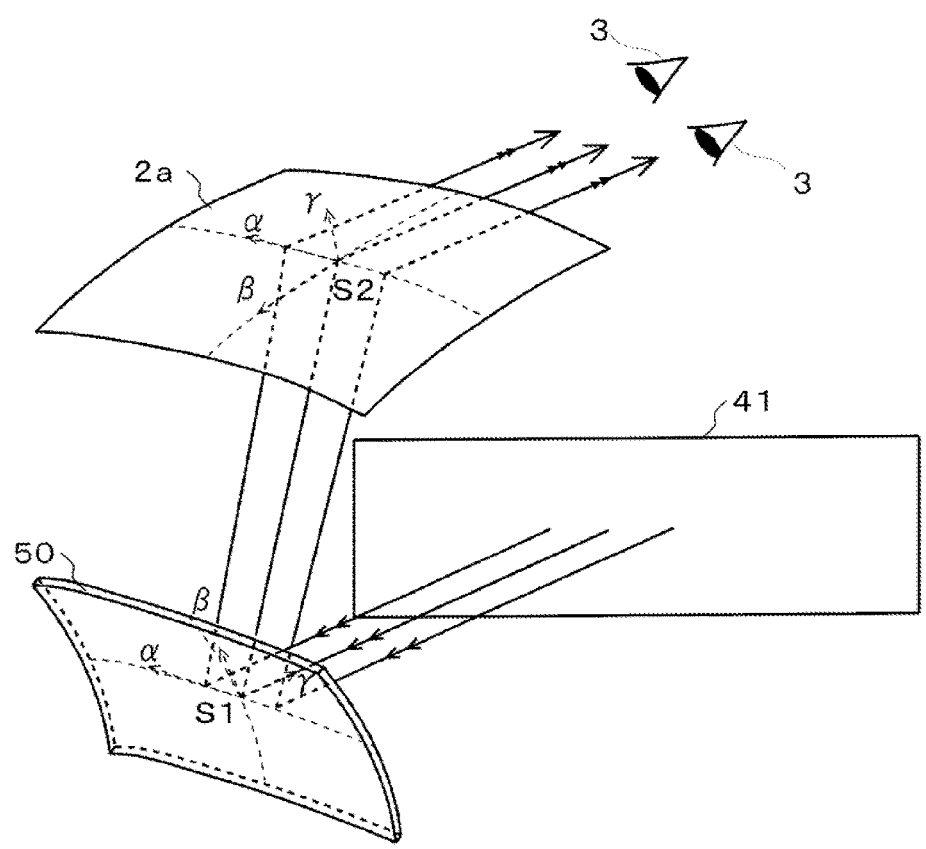
FIG. 5 is a schematic diagram for explaining optical simulation according to the above embodiment.

Referring to FIG. 5, a description will be given of the curved surface shape of the correction mirror 50 obtained by optical simulation.

In the optical simulation, regarding arbitrary reference points S1 and S2 as an origin, the correction mirror 50 and the windshield 2a are assumed to have a γ-axis in the direction vertical to the convex surface, an α-axis in the lateral direction of the vehicle 2, and a β-axis in the direction vertical to the α-axis and γ-axis (FIG. 5). In the optical simulation, the βγ plane (FIG. 5) corresponds to the YZ plane described above (FIGS. 1 and 2).

The curved surface shape (curvature) of the correction mirror 50 is, as shown in FIG. 5, determined by optical simulation based on parameters, such as, a curved surface shape of the windshield 2a, a positional relationship between the windshield 2a and the correction mirror 50, a position of the eye 3 of the observer, and a direction of the plurality of parallel transmitted light N incident on the correction mirror 50, to have a convex surface toward the windshield 2a such that the display light (transmitted light N) as the divergent light emitted from the correction mirror 50 enters the windshield 2a having a concave shape toward the inside of the vehicle 2, and the light incident on the windshield 2a reflects toward the eye 3 of the observer as light parallel to the YZ plane. Specifically, the parameters include a radius of curvature Rα in the α-axis direction of the windshield 2a (a radius of curvature about the cross section of the windshield 2a), a radius of curvature Rβ in the β-axis direction of the windshield 2a (a radius of curvature about the longitudinal section of the windshield 2a), an angle formed between the γ-axis and the Z-axis of the windshield 2a, a distance between the reference point S2 of the windshield 2a and the reference point S1 of the correction mirror 50, an angle formed between the γ-axis and Z-axis of the correction mirror 50, and a distance between the eye 3 of the observer and the reference point S2 of the windshield 2a. From these parameters, a curvature R1 of the correction mirror 50 in the α-axis direction and a curvature R2 in the β-axis direction are determined.

As described above, it is possible to obtain the curved surface shape of the correction mirror 50 from the curved surface shape of the windshield 2a by optical simulation.

Since the HUD device 1 includes the correction mirror 50 that emits light in a divergent direction based on the curved surface shape of the windshield 2a, the transmitted light N reflected by the correction mirror 50 and emitted from the HUD device 1 reflects on the windshield 2a, and becomes light parallel in the lateral direction of the eye 3 of the observer shown in FIG. 5 (light parallel to the YZ plane). Therefore, the observer views the virtual image V of the display image represented by the transmitted light N reflected by the windshield 2a (the virtual image projected onto the windshield 2a), and recognizes through the windshield 2a as if the display image is present in a distant place.

The housing 60 houses the display means 10, the folding mirror 20, the collimator lens 30, the parallel light guide 40, and the correction mirror 50, and positions and fixes each of these components. The housing 60 has the emitting part 61 for emitting the display light N reflected by the correction mirror 50 to the housing 60, and the attaching part 62 notched in a concave shape for attaching the engaging part 44 of the parallel light guide 40. Description of the display means 10, the folding mirror 20, the collimator lens 30, and the attaching part of the correction mirror 50 will be omitted.

The parallel light guide 40 is positioned by fitting the engaging part 44 into the attaching part 62 of the housing 60, thereby a plurality of parallel transmitted light N enters the correction mirror 50 from a predetermined direction. Specifically, the position (angle) of the parallel light guide 40 is set such that the plurality of transmitted light N having the exit angle B emitted from the parallel light guide 40 becomes light substantially parallel to the YZ plane.

(Control Unit)

A control unit (not shown) controls the light source 11, the liquid crystal display panel 13 and the like. For example, the control unit controls the liquid crystal display panel 13 by sending a video signal to the liquid crystal display panel 13. The control unit comprises a CPU, a ROM, a general-purpose memory, a video memory, an external interface and the like. The external interface is connected to a CAN (Control Area Network) bus for transmitting and receiving information on the light source 11, the liquid crystal display panel 13, and the vehicle 2. The external interface is also connected to an input means for accepting a key input for adjusting the brightness and the like of the light source 11.

According to the HUD device 1 described in the above embodiment, it is possible to form a parallel precisely between the semi-transparent surface 41 and the reflection surface 42 by providing the parallel light guide (parallel optical member) 40, in which the semi-transparent surface (first surface) 41 for transmitting and reflecting light is arranged in parallel to the reflection surface (second surface) 42 for reflecting light. Further, the parallel light M enters the semi-transparent surface 41 at the predetermined incident angle A, and the semi-transparent surface 41 and the reflection surface 42 are arranged in parallel. Thus, the reflection light reflecting in the parallel light guide 40 always enters the semi-transparent surface 41 at the predetermined incident angle A. Therefore, it is possible to emit stably the transmitted light N emitted from the semi-transparent surface 41 (passing through the semi-transparent surface 41) as parallel transmitted light (display light) N at the predetermined angle B with respect to the semi-transparent surface 41.

Second Embodiment

Figure 6:
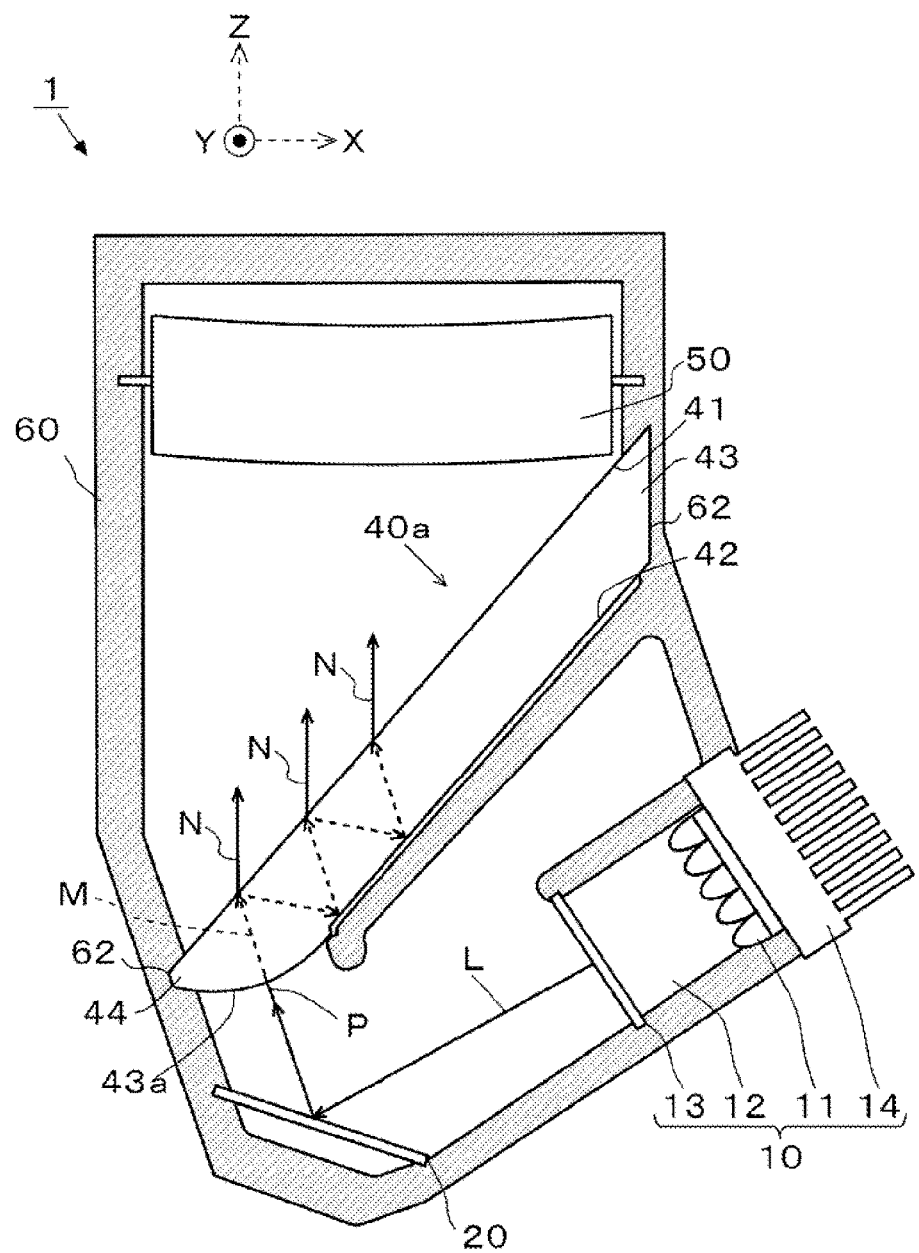
FIG. 6 is a schematic sectional view in an XZ plane showing a configuration of a headup display device according to a second embodiment of the present invention.

Hereinafter, a second embodiment according to the present embodiment will be described with reference to FIG. 6. FIG. 6 is a schematic sectional view in an XZ plane showing a configuration of a HUD device 1 according to a second embodiment of the present invention. The HUD device in the second embodiment has many parts common to the first embodiment described above. Thus, hereinafter, the common parts will be denoted by the same reference numerals, a detailed description thereof will be omitted, and different parts will be mainly described.

The HUD device 1 in the second embodiment is, as shown in FIG. 6, different from the first embodiment in that a parallel light guide 40a has a shape different from the parallel light guide 40 in the first embodiment, and a collimator lens 30 is not provided. The parallel light guide 40a has a convex light incident part 43a that enters image light L of a folding mirror 20 and collimates the image light L. With such a configuration, it is possible to enter precisely parallel light M into a semi-transparent surface 41 at a predetermined incident angle A without being affected by errors during assembly or vibrations of a vehicle. It is also possible to decrease a loss of light quantity when entering the parallel light M from the collimator lens 30 into the parallel light guide 40.

Third Embodiment

Figure 7:
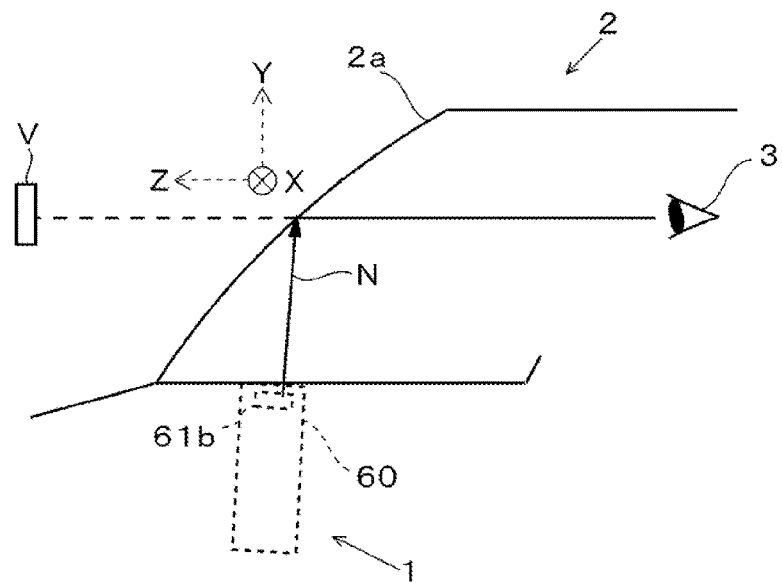
FIG. 7 is a schematic diagram showing a state that a headup display device according to a third embodiment of the present invention is mounted on a vehicle.
Figure 8:
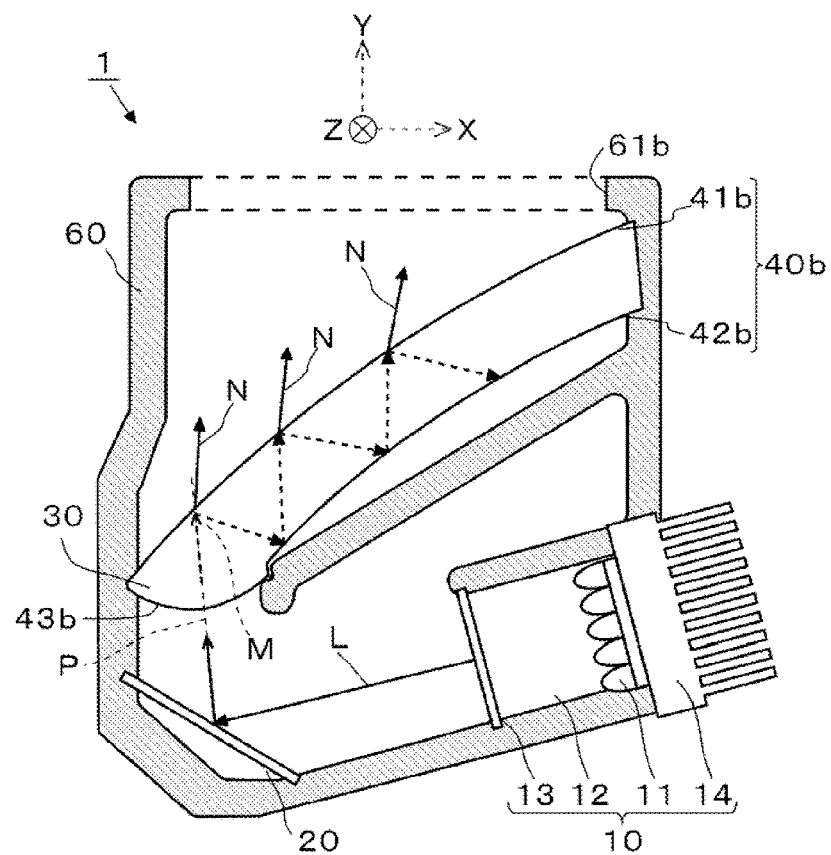
FIG. 8 is a schematic sectional view in an XY plane showing a configuration of a headup display device according to the above embodiment.
Figure 9:
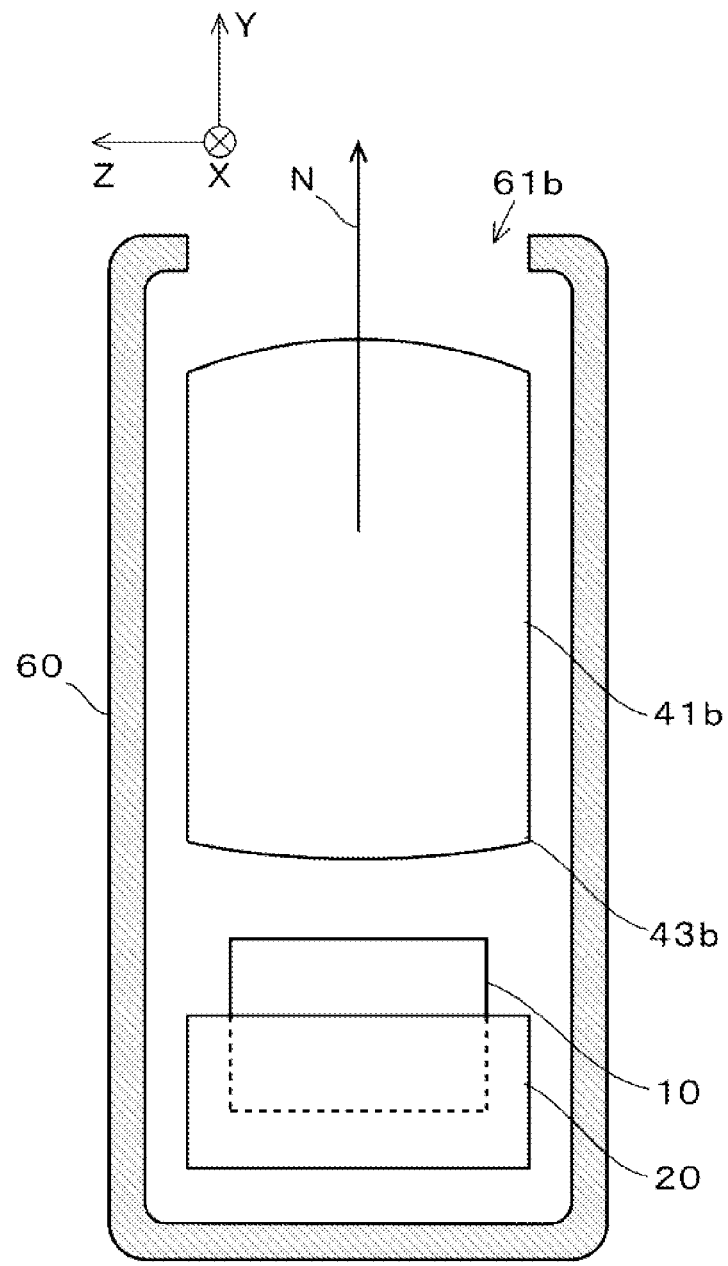
FIG. 9 is a schematic sectional view in a YZ plane showing a configuration of a headup display device according to the above embodiment.
Figure 10:
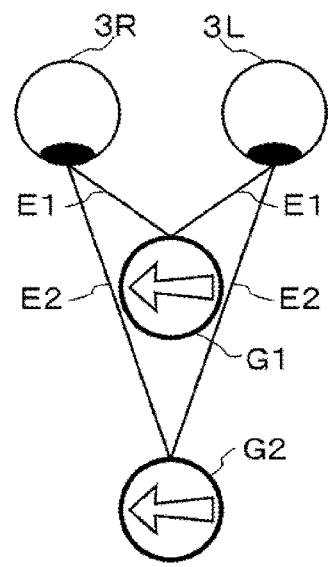
FIG. 10 is a diagram for explaining sense of perspective of a display.
Figure 11:
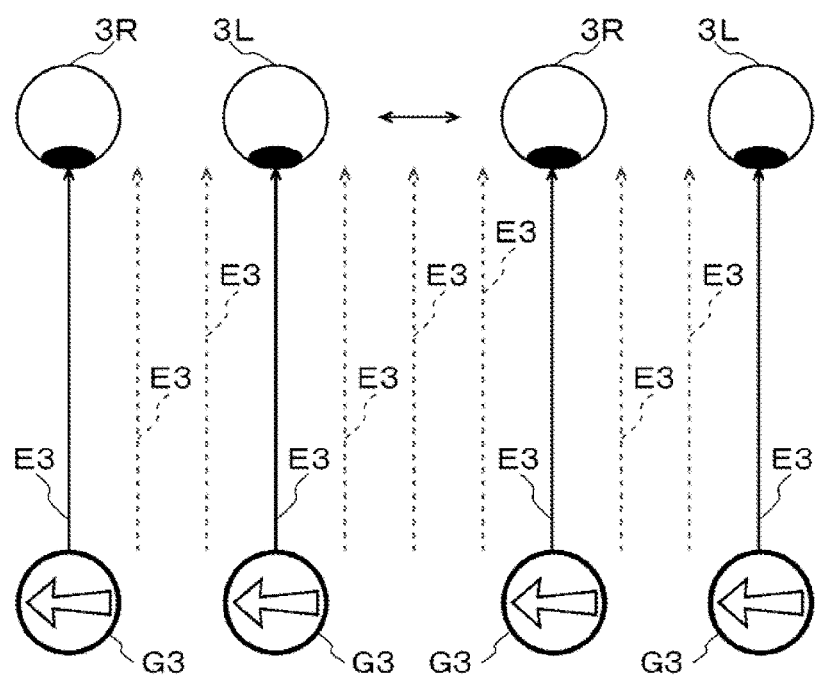
FIG. 11 is a diagram for explaining a distant display.

Hereinafter, a third embodiment in the present embodiment will be described with reference to FIGS. 7 to 9 (a detailed description of common parts will be omitted, and different parts will be mainly described). FIG. 7 is a schematic diagram showing a state that a HUD device according to the third embodiment is mounted on a vehicle. FIG. 8 is a schematic sectional view in a substantially XY plane showing a HUD device 1 in a vehicle 2 (FIG. 7). FIG. 9 is a schematic sectional view in a substantially YZ plane showing a HUD device 1 in a vehicle 2 (FIG. 7).

The HUD device 1 in the third embodiment is, as shown in FIG. 8, different from the first embodiment in that a parallel light guide 40b has a shape different from the parallel light guide 40 in the first embodiment, and the collimator lens 30 and the correction mirror 50 in the first embodiment are not provided. The parallel light guide 40b in the third embodiment has a convex light incident part 43b that enters image light L of a folding mirror 20 and collimates the image light L, a semi-transparent surface 41b that is formed by a curved surface for emitting divergent light (transmitted light) N toward a windshield 2a, and a reflection surface 42b that is formed by a surface parallel to the semi-transparent surface 41b. The curved surface shapes of the semi-transparent surface 41b and the reflection surface 42b are, similar to the correction mirror 50, obtainable from the curved surface shape of the windshield 2a by optional simulation or the like. The parallel light guide 40b in the third embodiment enters the image light L from the folding mirror 20 through the light incident part 43b, changes the light to parallel light M, and repeats reflection and transmission of the parallel light M between the semi-transparent surface 41b and the reflection surface 42b, thereby transmitting a plurality of transmitted light N toward the emitting part 61b (toward the windshield 2a) as light (divergent light) tilted in advance an optical axis considering a curvature of the windshield 2a. The plurality of transmitted light N tilted in advance an optical axis considering a curvature of the windshield 2a becomes light parallel to the YZ plane when reflecting on the windshield 2a, and enters each of the left and right eyes 3 of the observer as light parallel in the lateral direction. Therefore, the observer recognizes, through the windshield 2a, as if a display image is present in a distant place.

The collimator lens 30 may be an optical system comprising a plurality of convex lenses, or a combination of a convex lens and a concave lens and the likes. Further, a lenticular lens may be used as the collimator lens 30.

The plain surface onto which the virtual image V is projected is not limited to the windshield 2a of the vehicle 2. The plain surface onto which the virtual image V is projected may be a curved glass in a building, a spectacle lens and the like.

In the above description, in order to facilitate the understanding of the present invention, a description of unimportant known technical matters is omitted as appropriate.

INDUSTRIAL APPLICABILITY

A headup display device according to the present invention is applicable as a display device, which irradiates display light representing an image to a windshield of a vehicle, for example, and allows recognizing it as a virtual image superimposed on the background.

DESCRIPTION OF REFERENCE NUMERALS

1 Headup display device (HUD device)
2 Vehicle
2a Windshield
3 Eye
10 Display means
20 Folding mirror
30 Collimator lens (Collimating optics)
40 Parallel light guide (Parallel optical member)
41 Semi-transparent surface (First surface)

42 Reflection surface (Second surface)
43 Light incident part (Third surface)
50 Correction mirror
60 Housing
61 Emitting part
L Image light
M Parallel light
N Transmitted light (Display light)
P Lens optical axis

The invention claimed is:

1. A headup display device that projects display light to a curved surface, and allows recognizing an image represented by the display light as a virtual image, the headup display device comprising:
   a display that emits light representing the image;
   a collimating optics that collimates the light emitted from the display into parallel light; and
   a parallel optical member that emits a plurality of transmitted light from a first surface being provided in parallel to a second surface, the first surface entering the parallel light from the collimating optics, reflecting a part of the parallel light, and transmitting a part thereof as transmitted light, and the second surface reflecting the parallel light to the first surface,
   wherein the parallel light strikes the first surface at a predetermined incident angle, and the transmitted light of the first surface is projected as the display light, and
   wherein the first and second surfaces of the parallel optical member are both convex as viewed from the curved surface.

2. The headup display device according to claim 1, wherein
   the incident angle is smaller than a critical angle, and the first surface has a reflectance adjustment layer for increasing reflectance.

* * * * *